3,352,900
**ESTERS OF 2-SUBSTITUTED ETHYLTHIOL-
CARBONIC ACID**
Walter I. Kimoto and Edward A. Swakon, Hammond, Ind., and Edmund Field, Chicago, Ill., assignors to Standard Oil Company, Chicago, Ill., a corporation of Indiana
No Drawing. Filed July 17, 1963, Ser. No. 295,817
8 Claims. (Cl. 260—455)

This invention relates to esters of ethylthiolcarbonic acid having reactive groups on the terminal carbon of the ethyl group and more specifically pertains to a new process for preparing these unique compounds.

It has been discovered that by the use of a base catalyst, carbonyl sulfide can be reacted with an alcohol and certain compounds having an electron withdrawing group attached to an ethylene group. Illustrative of these reactant combinations are carbonyl sulfide with an alcohol and an olefin oxide, with an alcohol and an olefin sulfide, with an alcohol and an acrylonitrile, with an alcohol and a vinyl ketone or with an alcohol and an ester of an acrylic acid. The following five reactions are illustrative:

(I)

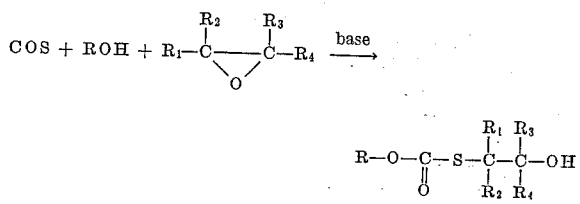

(II)

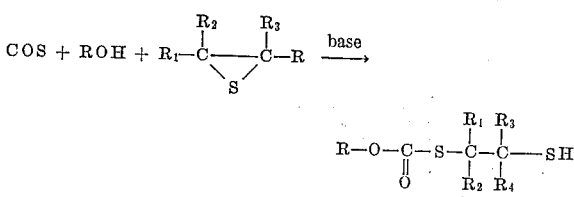

(III)

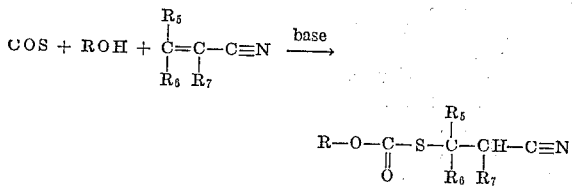

(IV)

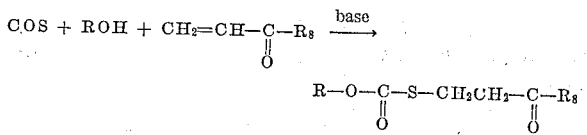

(V)

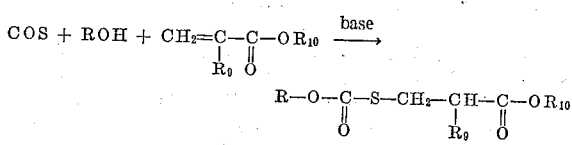

In the foregoing R can be such hydrocarbon groups as alkyl, cycloalkyl, and aralkyl hydrocarbon groups. The size of the R hydrocarbon groups is not critical for it does not enter into the reaction for only the hydroxyl group enters into the reaction. The ROH reactant is thus a monohydric alcohol having the characteristics of alkanols and not acidic as are the hydroxy aromatics. In both the olefin oxide and the olefin sulfide of Reactions I and II respectively, the R groups $R_1$, $R_2$, $R_3$ and $R_4$ can all be hydrogen as in ethylene oxide and ethylene sulfide, respectively, or they can be such hydrocarbon groups as alkyl, cycloalkyl, aryl, aralkyl and alkaryl hydrocarbon groups. The olefin oxide and olefin sulfide reactant can be an olefin dioxide or olefin disulfide, respectively, and the esters resulting will be esters of bis(beta-hydroxyethyl)-di-(ethylthiolcarbonic acids) and esters of bis(beta-mercaptoethyl)-di-(ethylthiolcarbonic acids), respectively. All of $R_1$, $R_2$, $R_3$, and $R_4$ can be the same substituent, e.g. all methyl groups, or they can be different or three can be alike and one different, etc. The precise size of $R_1$, $R_2$, $R_3$ and $R_4$ is not material since they do not enter into the reaction, for only the three membered rings are involved.

The $R_5$, $R_6$, $R_7$ of the acrylonitrile and derivatives thereof useful in the process of Reaction III can be all hydrogen as in acrylonitrile, or $R_6$ and $R_7$ hydrogen and $R_5$ methyl as in crotononitrile, or $R_6$ and $R_7$ hydrogen and $R_5$, or $R_5$, $R_6$ and $R_7$ can each, all or two of them be alkyl, cycloalkyl, aralkyl or aryl hydrocarbon groups with the remainder of them hydrogen when not a hydrocarbon and alkaryl group. It is again noted that $R_5$, $R_6$ and $R_7$ can be of any size since they do not enter into the reaction for only the vinyl carbon to carbon unsaturation enters into the reaction.

With respect to the vinyl ketones in Reaction IV, $R_8$ can be any non-reactive hydrocarbon group such as the alkyl, cycloalkyl, aralkyl and alkaryl hydrocarbon groups. The size of these R groups as before is not material since they do not enter into the reaction for it is only the vinyl carbon to carbon unsaturation which enters into the reaction.

With respect to the vinyl acid esters e.g. esters of acrylic acid, $R_9$ can be hydrogen as in the esters of acrylic acid or non-reactive hydrocarbon groups as alkyl, cycloalkyl, aralkyl, alkaryl and aryl hydrocarbon groups since only the vinyl carbon to carbon unsaturation enters into the reaction. The $R_{10}$ of the ester group can be the same non-reactive hydrocarbon group types as $R_9$ when not hydrogen. The size of $R_{10}$ is not material since it does not enter into the reaction.

Insofar as the foregoing five reactions are concerned, R of the alcohol must be hydrocarbon and aliphatic in nature and not reactive with COS or the other reactant or the catalyst. The other R groups of $R_1$, $R_2$, $R_3$, $R_4$, $R_5$, $R_6$, $R_7$ and $R_9$ when not hydrogen can be any non-reactive hydrocarbon group including methyl, ethyl, propyl, butyl, pentyl, hexyl, heptyl, octyl, nonyl, decyl and hendecyl, among other alkyl hydrocarbon groups up to hexacontyl; cyclohexyl, cyclopentyl, methyl cyclohexyl, dimethyl cyclohexyl and methyl cyclopentyl, among other cycloalkyl hydrocarbon groups; phenyl, tolyl, xylyl, isopropylphenyl, diisopropylphenyl, ethylphenyl, cyclohexylphenyl, biphenyl, naphthyl, methylnaphthyl, trimethylphenyl (hemimellityl), pseudocumyl, anthryl, and phenanthryl, among other aryl and alkyl substituted aryl hydrocarbons; benzyl, phenethyl, phenylbutyl, naphthylmethyl and 4-phenylbenzyl among other aryl substituted alkyl hydrocarbons. $R_8$ and $R_{10}$ also must be hydrocarbons and suitably can be any of the aforementioned specific hydrocarbons.

The process of this invention in general involves the reaction of an active hydrogen donor with a compound having an electron withdrawing group. The alkyl thiolcarbonic acids are the hydrogen donors. Although the alkyl thiolcarbonic acids might exist per se for a short increment of time in the reaction mixture, it is believed that they more likely exist in the form of a loosely formed salt. The alkyl thiolcarbonic acids are, of course, derived from the reaction of ROH alcohol and COS as follows:

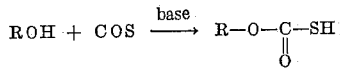

$$ROH + COS \xrightarrow{base} R-O-\underset{\underset{O}{\|}}{C}-SH$$

The base catalyst may even form a salt of the alkyl monothiolcarbonic acid but should not react irreversibly with COS or form such a stable salt with the monothiolcarbonic acid that reaction with olefin oxides or sulfides or with vinyl nitriles, vinyl ketones or esters of vinyl acids is prevented. The reaction mechanism has not been established with certainty and it is not intended to predicate invention upon any specific reaction mechanism even though, from the nature of the final product, the reaction between COS and the alcohol provides an active hydrogen attached to sulfur in a thiol group and this thiol group becomes the hydrogen donor to the various hydrogen acceptors.

Suitable base catalysts include alkali metal hydroxides e.g. sodium and potassium hydroxides; alkali alkoxides, e.g. sodium and potassium alkoxides of the ROH alcohol reactant; tertiary amines, e.g. trimethylamine, tributylamine, trioctylamine, N,N-diethyl aniline, N,N-dimethyl aniline and the like; and tetraalkyl guanidine, e.g. tetramethylguanidine. When the base catalyst used is a hydroxide or alkoxide or any base which will react with the active hydrogen acceptor, e.g. acrylonitriles among others; carbonyl sulfide must be used in excess to prevent the reaction between the hydrogen acceptor and the base catalyst.

The process of this invention can be conveniently carried out at low temperatures, 20 to 50° C. The resulting products are not thermally unstable at ordinary elevated temperatures so that reaction temperatures above 50° C. up to 100 to 200° C. can be employed but need not be. Exothermic reaction is involved so generally operating at temperatures below 100° C. will provide convenient removal or dissipation of heat of reaction. To prevent loss of carbonyl sulfide and to maintain carbonyl sulfide in excess when needed to prevent the strong base catalyst from reacting with the hydrogen acceptor reactant, the process of this invention is carried out in a closed reaction zone. This provides improved yields of the desired product. Where yield advantage is of no importance, the reactions can be conducted in open reaction vessels at atmospheric pressure. When the process of this invention is carried out in a closed reaction zone, e.g. a closed reaction vessel, pressures above atmospheric can be employed. Such elevated pressures can be the autogenetic pressure developed by the reactants at reaction temperature or a higher pressure imposed by the use of larger excesses of carbonyl sulfide introduced as a gas under pressure. In general, pressures above 200 p.s.i.g. offer no added advantage.

Specific suitable alcohol reactants (ROH) include, but are not limited to methanol, ethanol, the butanols, the propanols, the amyl acohols, hexanols, heptanols, octanols, and other alkanols up to and including octadecanol and higher where the R groups are saturated hydrocarbon groups, cyclohexanol, cyclopentanol, benzyl alcohol, phenethyl alcohol and the like which are aliphatic in nature and do not independently react with COS to form derivatives other than monothiolcarbonic acids or react independently with the hydrogen donors to prevent also reaction with COS.

Specific olefin oxides and sulfides include but are not limited to ethylene oxide, propylene oxide, cyclohexane oxide, octylene oxide, dodecene oxide, limonene monoxide, styrene oxide, dicyclopentene dioxide, limonene dioxide, vinylcyclohexene dioxide and the like and their corresponding sulfides, e.g. ethylene sulfide, propylene sulfide, cyclohexane sulfide, octylene sulfide, dodecene sulfide, limonene sulfide, styrene sulfide, dicyclopentene disulfide, limonene disulfide, vinylcyclohexene disulfide and the like.

Specific vinyl nitriles include but are not limited to acrylonitrile,
3-cyclohenylacrylonitrile,
2,3-(di-1-naphthyl)-acrylonitrile,
2,3-diphenylacrylonitrile,
3,3-diphenyl-2-m-(tolyl)acrylonitrile,
3,3-diphenyl-2-(p-tolyl)-acrylonitrile,
2-methyl-3-phenylacrylonitrile,
2-mesityl-3-phenylacrylonitrile,
triphenylacrylonitrile,
2-benzylacrylonitrile,
atroponitrile,
cinnamonitrile,
caprinitrile and
alpha-methylcaprinitrile, among others.

Specific vinyl ketones include but are not limited to vinyl methyl ketone,
vinyl ethyl ketone,
vinyl propyl ketone,
acrylophenone,
2,3-diphenyl acrylophenone,
3-ethylacrylophenone,
4'-methylacrylophenone,
4'-methyl-2-phenylacrylophenone,
2-methyl-acrylophenone,
3-phenylacrylophenone,
2,3,3-triphenylacrylophenone,
seneciophenone,
chalcone,
1-hexen-3-one,
4,4-diethyl-1-hexen-3-one,
2-ethyl-1-hexen-3-one,
5-methyl-1-hexen-3-one,
4-hexen-3-one,
3-hexen-2-one,
5,5-dimethyl-3-hexen-2-one,
1-hepten-3-one,
6,6-dimethyl-1,5-diphenyl-1-heptene-3-one,
5-ethyl-1-hepten-3-one,
2-hepten-4-one,
3-hepten-2-one,
5-ethyl-6-methyl-3-hepten-2-one,
5-hepten-2-one,
4-methyl-6-hepten-2-one,
1-octen-3-one,
5-methyl-1-octen-3-one,
5-propyl-1-octen-3-one,
2-octen-4-one,
4-octen-3-one,
3-hendecen-5-one,
4-hendecen-6-one, and
7-hendecen-5-one, among others.

Specific esters of acrylic acid include but are not limited to methyl acrylate, ethyl acrylate, propyl acrylate, methyl methacrylate, butyl methacrylate, isobutyl methacrylate, ethyl methacrylate, methyl cinnamate, methyl 3-anthrylacrylate, methyl alpha-methylenehydrocinnamate, methyl 2-methylenehexanoic acid, methyl 3-(p-t-butylphenyl)-3-phenylacrylate, methylcyclobutaneacrylate, methyl 3-cyclohexylacrylate, ethyl 2,3-diphenylacrylate, ethyl 3-naphthylacrylate, ethyl-2-methylene valeric acid, methyl atropate, methyl angelate, ethyl-2-pentenoate, ethyl alpha-methyleneisovalerate, methyl crotonate, ethyl 2-methyl-3,3-diphenylacrylate, ethyl naphthaleneacrylate and ethyl 4-methylheptenoate, among others.

Illustrative examples of the process of this invention and products derived therefrom are hereinafter provided for a clear understanding of this invention.

Examples 1 to 3

To each of three 250 milliliter flasks is added 100 milliliters absolute ethanol and 0.5 gram metallic sodium. The mixture in each flask is cooled in a Dry Ice-acetone bath. To the cooled ethanol solution of sodium ethoxide in each flask there is added 15 to 20 grams carbonyl sulfide and 0.2 mole of an olefin oxide. Ethylene oxide is added to the first flask, propylene oxide is added to the second flask and styrene oxide is added to the third flask. The three flasks are remove from the Dry Ice-acetone bath and left at room temperature, about 25° C., without application of heat except that supplied by ambient room temperature air. It was observed that when the contents of the flasks reached about 15° C. a vigorous exothermic reaction occurs and the contents of the flasks became semi-solid of yellow-green color. The contents of each flask are diluted with about six times their volume of water. The resulting mixture in each flask is separately extracted with 300 milliliters ether. The ether extracts are dried over sodium sulfate and the dried ether extracts are separately recovered by filtration.

Each recovered dried ether extract is separately heated in the presence of an acidic stabilizer (stearic acid or p-toluene sulfonic acid monohydrate) on a steam bath to remove ether. Each of the three residues are distilled. The boiling point and pressure at which the three products are obtained, the refractive index ($N_D^{20.5}$) and the product yield in grams and mole percent are hereinafter given in Table I.

TABLE I

| Product | Boiling Point at mm. Hg | Refractive Index ($N_D^{20.5}$) | Yield |
|---|---|---|---|
| Example 1 | 80–84° C. at 0.6 mm. Hg | 1.4811 | 8.5 g. (30%). |
| Example 2 | 72–74° C. at 0.5 mm. Hg | 1.4760 | 17 g. (51%). |
| Example 3 | 135–147° C. at 0.5 mm. Hg | 1.5465 | 22 g. (49%). |

The product of Example 1 is O-ethyl S-(beta-hydroxyethyl) monothiolcarbonate. In J. Org. Chem., 26, 5119 (1961), authors D. D. Reynolds, D. L. Fields and D. L. Johnson report that O-ethyl S-(beta-hydroxyethyl) monothiolcarbonate has a boiling point of 108° C. at 5 mm. Hg and a refractive index ($N_D^{25}$) of 1.4782.

The infra-red spectra of the recovered products of Examples 1, 2 and 3, each have hydroxy bands at $2.9\mu$ and carbonyl bands at $5.9\mu$. Following the procedure of D. D. Reynolds, D. L. Fields and D. L. Johnson in J. Org. Chem., 26, 5124 (1961), the product of Example 1 is converted into ethylene monothiolcarbonate.

The product of Example 2 is O-ethyl S-(2-hydroxypropyl) monothiolcarbonate. The product of Example 3 is O-ethyl S-(beta-hydroxy-beta-phenyl-ethyl) monothiolcarbonate.

The foregoing processes can be conducted with other alcohols aliphatic in nature. By the process of Example 1 carried out in the presence of tetraethylguanidine in place of sodium ethoxide, O-ethyl S-(beta-hydroxyethyl) monothiolcarbonate is again obtained. The yields of the O-alkyl S-(beta-hydroxyethyl) monothiolcarbonates can be improved over those of Examples 1, 2 and 3 by carrying out the reaction in a closed vessel and/or under carbonyl sulfide pressure of up to 200 p.s.i.g. to prevent COS loss to the atmosphere and/or provide excess COS to aid in driving the reaction toward completion.

The foregoing products of Examples 1, 2 and 3 although members of a known class of compounds have potential use as hereinbefore indicated and use as antiradiation agents and starting materials for the production of polyethylene sulfide and substituted polyethylene sulfide polymers.

Example 4

A mixture of 70 milliliters of 6 weight percent sodium ethoxide in absolute ethanol and 3 grams of carbonyl sulfide cooled in a flask by a Dry Ice-acetone bath is added to 8 grams of ethylene sulfide in a 300 milliliter stainless steel reaction vessel. The reaction vessel is sealed and 10 grams of carbonyl sulfide are pumped into the reaction vessel through a valved charging line. The resulting mixture is agitated on a rocker at 25° C. for about 12 hours. Excess carbonyl sulfide is vented and the contents of the reaction vessel are combined with 600 milliliters water and the aqueous mixture extracted with 300 milliliters of ether in two portions. The ethereal extracts are combined, washed with water and dried over anhydrous magnesium sulfate. The dried ethereal extract is recovered by filtration and the ether removed by heating on a steam bath leaving a residue.

The residue is distilled and a fraction boiling at 66–69° C. at 0.6 mm. Hg is collected. This fraction has a refractive index of 1.5281 ($N_D^{20.3}$) and is recovered in a 45% yield (9.5 grams). The infrared spectrum of this fraction shows a weak band at $3.9\mu$ characteristic of a sulfhydryl group (—SH) and a strong band at $5.9\mu$ (carbonyl group). The foregoing fraction is O-ethyl S-beta-mercaptoethyl monothiolcarbonate. This is the sulfhydryl analog of the compound of Example 1. O-ethyl S-(2-mercaptopropyl) monothiolcarbonate is prepared by repeating Example 4 except substituting propylene sulfide for ethylene sulfide. By repeating Example 4 except substituting sytrene sulfide for ethylene sulfide there is obtained O-ethyl S-(beta-mercapto-beta-phenylethyl) monothiolcarbonate.

The processes of Example 1 or Example 4 may be employed to prepare O-ethyl S-(beta-hydroxyoctyl) monothiolcarbonate and O-ethyl S-(beta-mercaptoctyl) monothiolcarbonate by substituting octylene oxide and octylene sulfide, respectively, for ethylene oxide or ethylene sulfide.

O-benzyl - S-(beta-hydroxyethyl) monothiolcarbonate may be prepared by the reaction of benzyl alcohol, carbonyl sulfide and ethylene oxide in the presence of tetraethylguanidine. O-methyl S-(1-methyl-2-hydroxybutyl) monothiolcarbonate may be prepared from methanol, COS and 2,3,-epoxybutane in the presence of tetramethylguanidine. O-ethyl S-(1,2-diphenyl 2-hydroxyethyl) monothiolcarbonate may be prepared from alpha,alpha'-epoxybibenzyl, COS and ethanol in the presence of potassium ethoxide. O-cyclohexyl S-(beta-hydroxyethyl) monothiolcarbonate may be prepared from COS, ethylene oxide and cyclohexanol reacted in the presence of tetramethylguanidine. O-phenethyl S-(beta-mercapto propyl) monothiolcarbonate may be prepared from phenethanol, COS and propylene sulfide in the presence of sodium phenethoxide. An interesting compound, 1-hydroxy-2-(carbethoxythio)-8-hydroxy-O-(carbethoxythio)-p-menthane may be obtained by reacting COS, ethanol and limonene dioxide in the presence of sodium ethoxide.

Example 5

To a cooled solution of 5 grams sodium pellets dissolved in 100 milliliters absolute ethanol there is added 5 grams carbonyl sulfide. This solution together with 9 grams of acrylonitrile is added to a 300 milliliter stainless steel reaction vessel. The vessel is sealed and 15 milliliters carbonyl sulfide pumped into the vessel through a valved charging line. The charging valve is closed, the vessel is rocked for 2.5 hours at room temperature (about 27° C.) and left unagitated for about 12 hours. Excess carbonyl sulfide is then vented and the reaction vessel contents added to 600 grams water, acidified with 20% sulfuric acid and extracted with two portions of 400 milliliters of ether. The ethereal extracts are combined, washed with water and dried over anhydrous sodium sulfate. The dried ether solution is recovered by filtration and the ether evaporated by heating the solution with steam bath. The residue left is distilled at reduced pressure and a fraction (28.5 grams a 90% yield) boiling at 88–90° C. and 0.6 mm. Hg pressure is recovered. This fraction has a refractive index of 1.4752 ($N_D^{20.5}$). From the infra-red spectrum of a sample of this fraction there is a weak band at 4.5μ characteristic of a cyano group and a strong band at 5.9μ characteristic of carbonyl. The fraction is identified as O-ethyl S-(beta-cyanoethyl) monothiolcarbonate.

*Example 6*

The process of Example 5 is repeated except ethyl acrylate is substituted for acrylonitrile. By this process O-ethyl-S-(2-carbethoxyethyl) monothiolcarbonate may be prepared.

*Example 7*

To prepare O - propyl-S-(2-carbomethoxy-isopropyl) monothiolcarbonate there may be reacted carbonyl sulfide, anhydrous propanol and methyl methacrylate in the presence of sodium propoxide.

*Example 8*

The process of Example 5 is repeated except that acrylophenone is employed in place of acrylonitrile. By this process O-ethyl S-(2-benzoylethyl) monothiolcarbonate may be obtained.

*Example 9*

The process of Example 5 is repeated except that vinyl ethyl ketone is employed instead of acrylonitrile. By this process O-ethyl S-(acetylethyl) monothiolcarbonate is obtained.

The presence of sulfur in the monothiolcarbonic acid group gives insecticidal and fungicidal properties to compounds of this invention. The reactive sites: hydroxy, mercapto and cyano groups provide reactive groups with which additional ester groups can be formed for example by acetylation of the hydroxy groups, mercaptids can be formed by reaction of a metal with the mercapto group, the cyano group can be converted to a methylamine group ($-CH_2-NH_2$) or to a carboxylic acid group or reacted with alcohol to provide an imido-ester group.

What is claimed is:

1. A process for the preparation of diesters of monothiolcarbonic acid selected from the group consisting of:

(A), (B), (C), (D), (E)

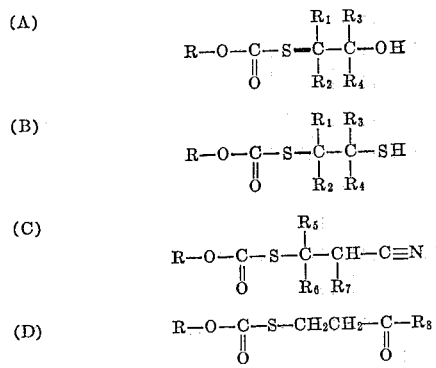

which comprises reacting carbonyl sulfide, an alcohol having the formula ROH wherein R is selected from the group consisting of alkyl, cycloalkyl and aralkyl hydrocarbon groups; and a hydrogen acceptor compound selected from the class consisting of an olefin oxide having the formula

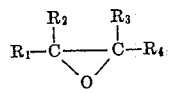

an olefin sulfide having the formula

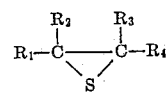

an acrylonitrile having the formula

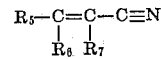

a vinyl ketone having the formula

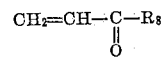

and an ester of an α-methylene carboxylic acid having the formula

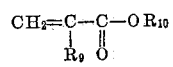

wherein $R_1$, $R_2$, $R_3$, $R_4$, $R_5$, $R_6$, $R_7$ and $R_9$ are selected from the class consisting of hydrogen and alkyl, cycloalkyl, aryl, aralkyl and alkaryl hydrocarbon groups; $R_8$ is selected from the class consisting of alkyl, cycloalkyl, alkaryl and aralkyl hydrocarbon groups; and $R_{10}$ is selected from the class consisting of alkyl, cycloalkyl, aralkyl, alkaryl and aryl hydrocarbon groups; at a temperature in the range of 20 to 200° C. and in the presence of a base catalyst selected from the class consisting of alkali metal hydroxides, alkali alkoxides of said ROH alcohols, tertiary amines and tetraalkyl guanidines.

2. The process of claim 1 wherein the base catalyst is sodium ethoxide and the alcohol is ethanol.

3. The process of claim 1 wherein the base catalyst is tetramethylguanidine.

4. The process of claim 1 wherein the base catalyst is sodium ethoxide, the alcohol is ethanol, the hydrogen acceptor is ethylene oxide and the product is O-ethyl S-beta-hydroxyethyl monothiolcarbonate.

5. The process of claim 1 wherein the base catalyst is sodium ethoxide, the alcohol is ethanol, the hydrogen acceptor is propylene oxide and the product is O-ethyl S-beta-hydroxy-propyl monothiolcarbonate.

6. The process of claim 1 wherein the base catalyst is sodium ethoxide, the alcohol is ethanol, the hydrogen acceptor is styrene oxide and the product is O-ethyl S-(2-hydroxyphenethyl) monothiolcarbonate.

7. The process of claim 1 wherein the base catalyst is sodium ethoxide, the alcohol is ethanol, the hydrogen acceptor is acrylonitrile and the product is O-ethyl S-(2-cyanoethyl) monothiolcarbonate.

8. The process of claim 1 wherein the base catalyst is sodium ethoxide, the alcohol is ethanol, the hydrogen acceptor is ethylene sulfide and the product is O-ethyl S-(beta-mercaptoethyl) monothiolcarbonate.

References Cited

UNITED STATES PATENTS 3,028,417  4/1962  Eisenmann _____ 260—455 X
3,213,108  10/1965  Osborn et al. _____ 260—455 X CHARLES B. PARKER, *Primary Examiner.*

D. R. MAHANAND, D. R. PHILIPS,
*Assistant Examiners.*